(12) United States Patent
Trönnberg et al.

(10) Patent No.: US 8,521,385 B2
(45) Date of Patent: Aug. 27, 2013

(54) METHOD OF CONTROLLING A TORQUE VECTORING MECHANISM AND TORQUE VECTORING SYSTEM

(75) Inventors: Gabriel Per Erik Ivar Trönnberg, Trollhättan (SE); Simon Ola André Yngve, Trelleborg (SE)

(73) Assignee: e-AAM Driveline Systems AB, Trollhättan (SE)

( * ) Notice: Subject to any disclaimer, the term of this patent is extended or adjusted under 35 U.S.C. 154(b) by 246 days.

(21) Appl. No.: 13/220,880

(22) Filed: Aug. 30, 2011

(65) Prior Publication Data

US 2012/0053802 A1 Mar. 1, 2012

Related U.S. Application Data

(60) Provisional application No. 61/378,095, filed on Aug. 30, 2010.

(51) Int. Cl.
 *G06F 7/00* (2006.01)
(52) U.S. Cl.
 USPC ............. 701/69; 701/70; 701/89; 180/65.21; 180/65.6; 303/140; 303/152; 303/155; 303/196
(58) Field of Classification Search
 USPC .................. 701/69, 70, 89; 180/65.21–65.6; 303/140, 152, 155, 196
 See application file for complete search history.

(56) References Cited

U.S. PATENT DOCUMENTS

| 6,549,842 | B1 | 4/2003 | Hac et al. |
| 2001/0042652 | A1 | 11/2001 | Watson et al. |
| 2007/0074565 | A1 | 4/2007 | Jayakumar et al. |
| 2009/0272592 | A1 | 11/2009 | Gaffney |

FOREIGN PATENT DOCUMENTS

EP 1985827 A1 10/2008

OTHER PUBLICATIONS von Vietinghoff, Anne: "Nichtlineare Regelung von Kraftfahrzeugen in querdynamisch kritischen Fahrsituationen".
Klomp Matthijs: "On Drive Force Distribution and Road Vehicle Handling—A Study of Understeer and Lateral Grip".
Klomp, Matthijs: "Longitudinal Force Distribution and Vehicle Handling".

*Primary Examiner* — James Trammell
*Assistant Examiner* — Majdi Alsomiri
(74) *Attorney, Agent, or Firm* — Harness, Dickey & Pierce, P.L.C.

(57) ABSTRACT

A method of controlling a torque vectoring mechanism and an associated torque vectoring system are disclosed. The method can distribute torque between a left non-driven wheel and a right non-driven wheel of a vehicle based on a torque control value. The torque control value can be based on a change in yaw moment about a center of gravity of the vehicle. The change in yaw moment can be determined based on a reduction of lateral force on a driven axle due to both longitudinal and lateral slip on the driven wheels.

20 Claims, 3 Drawing Sheets

METHOD OF CONTROLLING A TORQUE VECTORING MECHANISM AND TORQUE VECTORING SYSTEM

CROSS-REFERENCE TO RELATED APPLICATIONS

This application claims the benefit of U.S. Provisional Application No. 61/378,095, filed on Aug. 30, 2010. The entire disclosure of the above application is incorporated herein by reference.

TECHNICAL FIELD

The present disclosure relates to a control of a vehicle and, more specifically, a system and method of controlling a torque vectoring mechanism to distribute torque between the wheels of a vehicle.

BACKGROUND

Vehicle handling and stability have been important areas of research for quite some time due to an increased focus on traffic safety and because of customer demand. Two common types of undesirable conditions that a vehicle, such as a car, may encounter are referred to as oversteering and understeering. Oversteering is the situation where the rear end of the vehicle moves towards the outside of a turn instead of following the curvature of the turn. Understeering is the opposite situation where the front end of the vehicle moves towards the outside of the turn instead of following the curvature of the turn.

One particular problem relating to vehicle handling relates to cornering of a two-wheel drive vehicle, such as a front wheel drive vehicle. When a driver applies the throttle of a front wheel drive vehicle, the longitudinal slip of the tires of the driven front axle increases and, due to the properties of pneumatic tires, the lateral force capacity of the tire (that is, the amount of additional force in a lateral direction that can be supported by the tire) will be reduced. If the throttle is applied during cornering when the force on the tires is already at or near the maximum amount of force in a lateral direction that can be supported by the tire (that is, the lateral force capacity is approaching zero), the increased longitudinal slip of the tires may cause the driven front axle to saturate, which may cause the vehicle yaw rate to decrease and the vehicle will be subjected to understeer (meaning that the front end of the vehicle moves towards the outside of the turn instead of following the desired path of the turn). Similarly, a rear wheel driven vehicle may be subject to oversteer during cornering for the same reasons.

There exist several ways of controlling the vehicle in order to counteract an oversteer or an understeer condition. For example, a torque vectoring mechanism may be used to distribute a torque between a left and a right rear wheel and in this way counteract the understeer or oversteer condition. More specifically, if the vehicle is subject to understeer in a turn, the torque vectoring mechanism may be controlled to increase the torque on the outer rear wheel. Conversely, if the vehicle is subject to oversteer in a turn, the torque vectoring mechanism may be controlled to increase the torque of the inner rear wheel.

There is a need for a method for controlling a torque vectoring mechanism, as well as a torque vectoring system, that provides improved performance.

SUMMARY

In accordance with various embodiments of the present disclosure, a method of controlling a torque vectoring mechanism of a vehicle having a driven axle associated with a left driven wheel and a right driven wheel and a non-driven axle associated with a left non-driven wheel and a right non-driven wheel is disclosed. The torque vectoring mechanism can configured to distribute torque between the left non-driven wheel and the right non-driven wheel based on the method. The method can include: receiving a first speed value corresponding to a speed of the vehicle in a longitudinal direction; receiving a second speed value corresponding to a speed of the left driven wheel in a forward direction; receiving a third speed value corresponding to a speed of the right driven wheel in the forward direction; receiving a fourth speed value corresponding to a speed of the vehicle in a lateral direction at a left driven wheel location; and receiving a fifth speed value corresponding to a speed of the vehicle in the lateral direction at a right driven wheel location. The method can determine a first longitudinal slip value of the left driven wheel based on the first speed value and the second speed value and a second longitudinal slip value of the right driven wheel based on the first speed value and the third speed value. The method can also include: determining a first lateral slip value of the left driven wheel based on the second speed value and the fourth speed value, and determining a second lateral slip value of the right driven wheel based on the third speed value and the fifth speed value. A reduced lateral force value of the driven axle can be determined based on the first longitudinal slip value, the second longitudinal slip value, the first lateral slip value, and the second lateral slip value. The method can further determine: a change of yaw moment about a center of gravity of the vehicle based on the reduced lateral force value and a torque control value based on the change of yaw moment. Additionally, the method can distribute torque between the left non-driven wheel and the right non-driven wheel based on the torque control value.

In accordance with various embodiments of the present disclosure, a torque vectoring system is disclosed. The torque vectoring system can include a torque vectoring mechanism and a controller. The torque vectoring mechanism can be associated with a vehicle having a driven axle associated with a left driven wheel and a right driven wheel and a non-driven axle associated with a left non-driven wheel and a right non-driven wheel. Further, the torque vectoring mechanism can distribute torque between the left non-driven wheel and the right non-driven wheel based on a torque control value. The controller can determine the torque control value and also provide the torque control value to the torque vectoring mechanism. The controller can determine the torque control value by: receiving a first speed value corresponding to a speed of the vehicle in a longitudinal direction; receiving a second speed value corresponding to a speed of the left driven wheel in a forward direction; receiving a third speed value corresponding to a speed of the right driven wheel in the forward direction; receiving a fourth speed value corresponding to a speed of the vehicle in a lateral direction at a left driven wheel location; and receiving a fifth speed value corresponding to a speed of the vehicle in the lateral direction at a right driven wheel location. The controller can determine a first longitudinal slip value of the left driven wheel based on the first speed value and the second speed value and a second longitudinal slip value of the right driven wheel based on the first speed value and the third speed value. The controller can also include: determining a first lateral slip value of the left driven wheel based on the second speed value and the fourth speed value, and determining a second lateral slip value of the right driven wheel based on the third speed value and the fifth speed value. A reduced lateral force value of the driven axle can be determined by the controller based on the first longitudinal slip value, the second longitudinal slip value, the first lateral slip value, and the second lateral slip value. The controller can further determine: a change of yaw moment about a center of gravity of the vehicle based on the reduced lateral force value and a torque control value based on the change of yaw moment In accordance with various embodiments of the present disclosure, a non-transitory tangible computer readable medium encoded with instructions which, when executed, cause a processor to perform operations to control a torque vectoring mechanism is disclosed. The torque vectoring mechanism can be associated with a vehicle having a driven axle associated with a left driven wheel and a right driven wheel and a non-driven axle associated with a left non-driven wheel and a right non-driven wheel, the torque vectoring mechanism configured to distribute torque between the left non-driven wheel and the right non-driven wheel. The operations can include: receiving a first speed value corresponding to a speed of the vehicle in a longitudinal direction; receiving a second speed value corresponding to a speed of the left driven wheel in a forward direction; receiving a third speed value corresponding to a speed of the right driven wheel in the forward direction; receiving a fourth speed value corresponding to a speed of the vehicle in a lateral direction at a left driven wheel location; and receiving a fifth speed value corresponding to a speed of the vehicle in the lateral direction at a right driven wheel location. The operations can further include determining a first longitudinal slip value of the left driven wheel based on the first speed value and the second speed value and a second longitudinal slip value of the right driven wheel based on the first speed value and the third speed value. The operations can also include: determining a first lateral slip value of the left driven wheel based on the second speed value and the fourth speed value, and determining a second lateral slip value of the right driven wheel based on the third speed value and the fifth speed value. Further, the operations can include determining a reduced lateral force value of the driven axle based on the first longitudinal slip value, the second longitudinal slip value, the first lateral slip value, and the second lateral slip value. Additionally, the operations can include determining: a change of yaw moment about a center of gravity of the vehicle based on the reduced lateral force value and a torque control value based on the change of yaw moment. The operations can also include distributing torque between the left non-driven wheel and the right non-driven wheel based on the torque control value.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
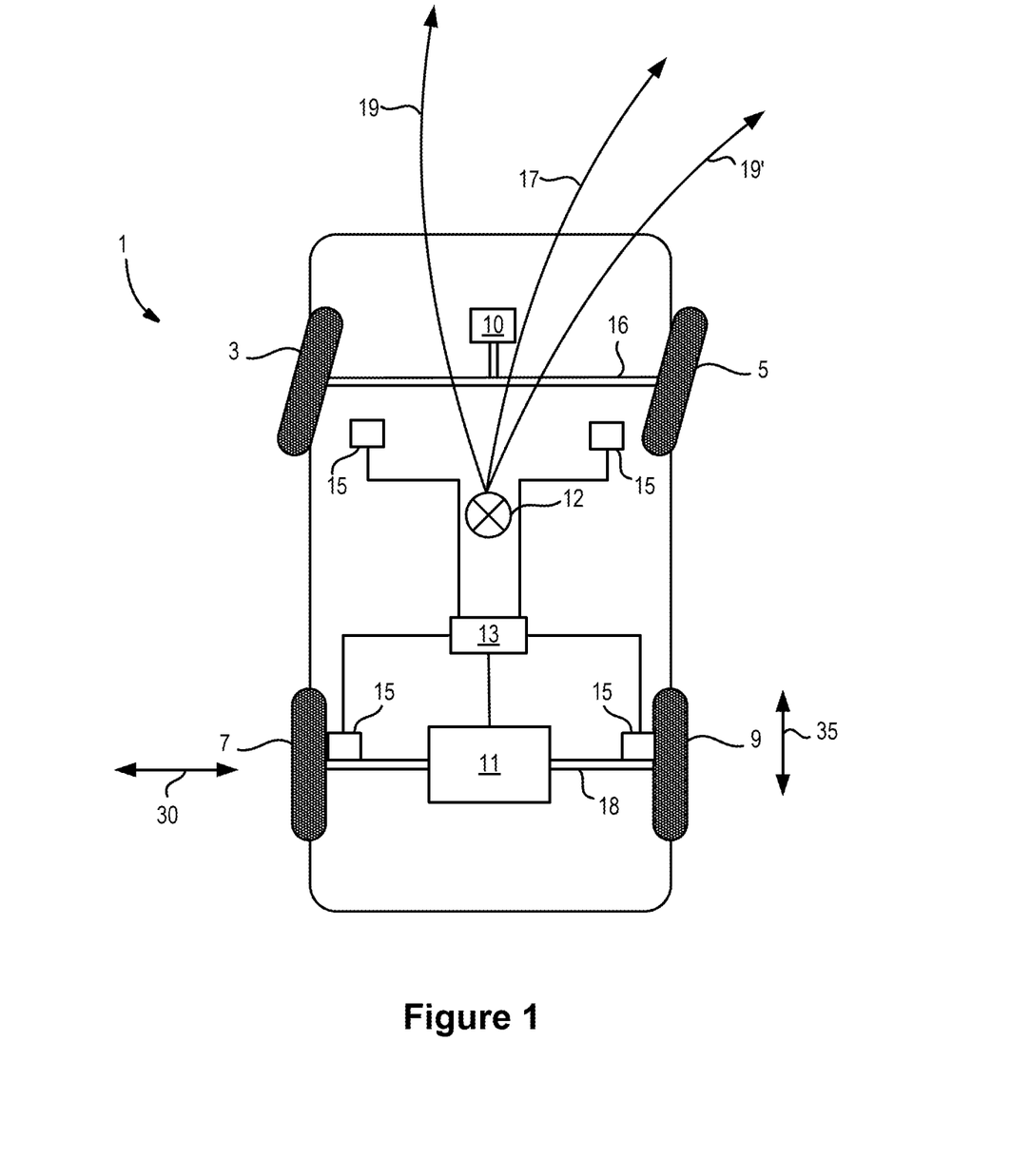
FIG. 1 schematically illustrates a top view of a vehicle including a system for controlling a torque vectoring mechanism according to some embodiments of the present disclosure.

Referring now to FIG. 1, a motorized vehicle 1 according to some embodiments of the present disclosure is illustrated. The vehicle 1 includes a left front wheel 3, a right front wheel 5, a left rear wheel 7, and a right rear wheel 9. The vehicle is typically driven by a main drive source 10, such as a combustion engine or electric motor, that provides rotary power to the front wheels 3, 5 ("front-wheel drive"), the rear wheels 7, 9 ("rear wheel drive") or to both the front and rear wheels ("all-wheel drive" or "four-wheel drive"). While the vehicle 1 is illustrated in FIG. 1 as having a main drive source 10 with a front-wheel drive configuration (that is, a main drive source 10 that provides rotary power to the front wheels 3, 5 via a driven axle 16), the system and method described below can be applied to a vehicle having a main drive source with a rear-wheel drive configuration or a four-wheel drive configuration with minor modifications.

The vehicle 1 includes a torque vectoring system that comprises a torque vectoring mechanism 11 and a controller 13. In the illustrated example, the torque vectoring mechanism 11 is mounted, and arranged to distribute torque, between the wheels that are not connected to the main drive source 10, that is, the torque vectoring mechanism 11 is mounted between the rear wheels 7, 9. In some embodiments, the torque vectoring mechanism 11 may be arranged to apply counter-directed torques to the left and to the right rear wheels 7, 9, e.g., via a non-driven axle 18. For example only, a torque of a certain direction and magnitude may be applied to the left rear wheel 7 and a torque having the same magnitude (or a different magnitude) but the opposite direction may be applied to the right rear wheel 9. One example torque vectoring mechanism is disclosed in U.S. Ser. No. 13/182,153 filed Jul. 13, 2011, the disclosure of which is hereby incorporated by reference as if set forth in its entirety herein.

In order to distribute a torque between the left rear wheel 7 and the right rear wheel 9, the torque vectoring mechanism 11 may comprise a differential (not shown), which can comprise differential gearing (not shown), and a means for generating a torque difference. The torque difference generating means can comprise brakes, clutches, motors, reversing gears and/or any other means for selectively inputting additional torque and/or removing torque from that which is otherwise transmitted through the rear wheels 7, 9 to the road surface. In the particular example provided, the torque difference generating means comprises an auxiliary drive mechanism (not shown), such as an electric motor. The auxiliary drive mechanism may generate a torque that is distributed to the left and right rear wheels 7, 9, for example, via the gearing mechanism of the active rear differential. Other forms of a torque vectoring mechanism 11 can be utilized, such as individual wheel motors that are connected, and directly distribute torque, to the rear wheels 7, 9.

The controller 13 can be configured to control the torque vectoring mechanism 11. As used herein, the term controller refers to an application specific integrated circuit (ASIC), an electronic circuit, a processor (shared, dedicated or group) and memory that executes one or more software or firmware programs, a combinational logic circuit, or other suitable components that provide the described functionality. In some embodiments, the controller 13 can be configured to determine and transmit to the torque vectoring mechanism 11 a torque control signal indicative of the torque to be distributed to the left and right rear wheels 7, 9.

The controller 13 may further be coupled to sensors 15 mounted on the vehicle 1 that are configured to measure various parameters related to a substantially present or real-time condition of the vehicle 1, such as wheel speeds, vehicle yaw rate, vehicle speed, and steering angle. These measured parameters can be employed by the controller 13 to generate the torque control signal, as further described below.

Figure 2:
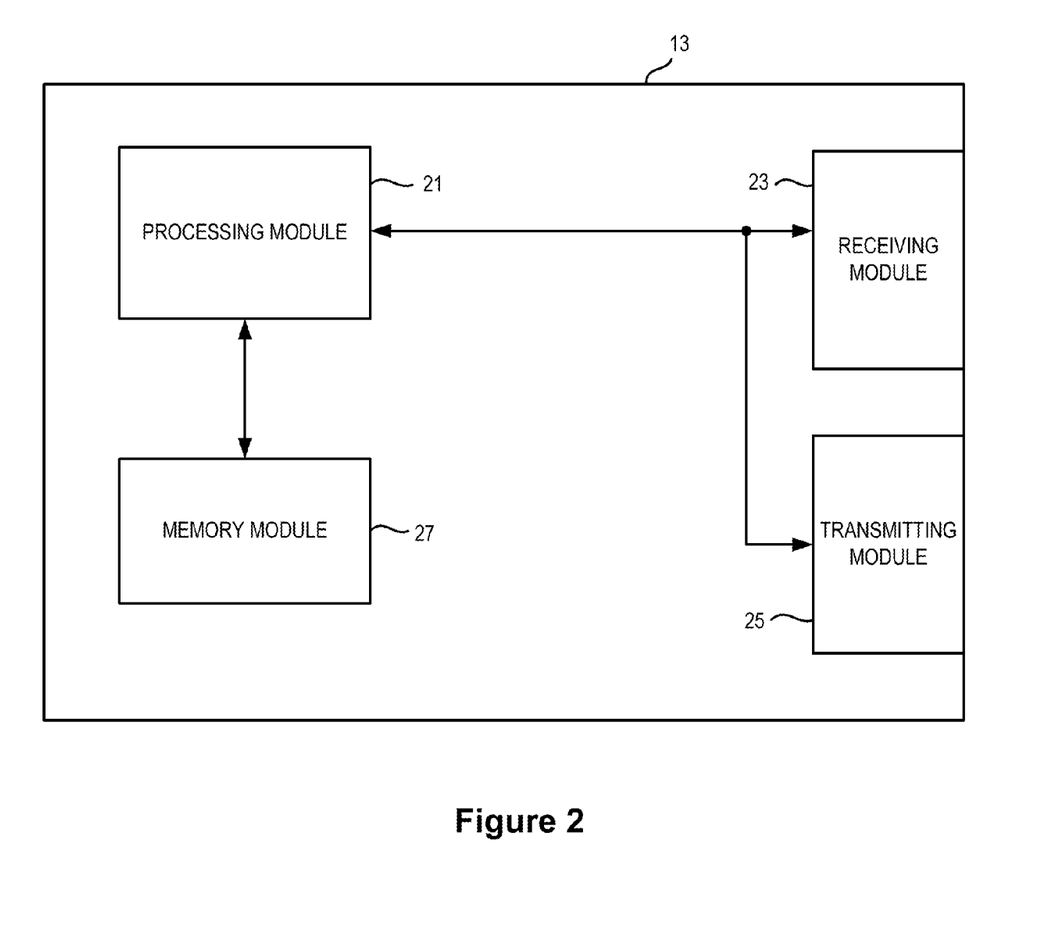
FIG. 2 is a block diagram illustrating an example controller of the system for controlling a torque vectoring mechanism of FIG. 1.

An exemplary embodiment of the controller 13 is illustrated in more detail in FIG. 2. The controller 13 includes a processing module 21, a receiving module 23, a transmitting module 25 and a memory module 27. The receiving module 23 can be configured to receive data signals from external units, devices and apparatuses in any known manner. For example, the receiver module 23 may be arranged to receive data signals from the sensors 15. Similarly, the transmitter module 25 can be configured to transmit data signals to external units, devices, and apparatuses in any known manner. In some embodiments, the receiver module 23 and the transmitter module 25 can be part of a common transceiver configured to both receive and transmit data signals.

The memory module 27 can be configured to store software instructions pertaining to a computer-implemented method for controlling the torque vectoring mechanism 11 of the vehicle 1. The memory module 27 can thus form a computer-readable medium upon which software instructions can be stored. The software instructions may cause the processing module 21 to execute a method according to various embodiments of the present disclosure.

Referring again to FIG. 1, the vehicle 1 is shown in an understeer situation, meaning that the front wheels 3, 5 have lost grip in a turn while the rear wheels 7, 9 are still gripping. Consequently, the front end of the vehicle 1 moves (or "slides") toward the outside of the turn in an understeer situation such that the actual path 19 of the vehicle 1 "overshoots" a desired vehicle path 17 (i.e., a path that the vehicle 1 would traverse if the front wheels 3, 5 had retained their grip through the turn). Throughout this description, the right rear wheel 9 may be described as the inner rear wheel and the left rear wheel 7 may be described as the outer rear wheel because the vehicle 1 is depicted in FIG. 1 as going through a turn to the right. It will be appreciated, however, that were the vehicle 1 to be in an understeer situation while in a turn to the left, the left rear wheel 7 would be the inner rear wheel and the right rear wheel 9 would be the outer rear wheel.

In some situations, the understeering of the vehicle 1 can be counteracted in part or in whole by increasing the driving force or torque on the outer rear wheel (the left rear wheel 7 in the situation shown in FIG. 1). Understeer can be a result of the lateral force (that is, the force in the lateral direction 30) exerted upon one or both of the front wheels that is required to maintain the vehicle along the desired path (for example, desired path 17) being greater than the lateral force capacity of the wheel(s).

One skilled in the art will recognize that an oversteer situation, in which the rear end of the vehicle 1 moves towards the outside of the turn such that the vehicle 1 follows the path 19' instead of the desired path 17, is similar to an understeer situation and may be counteracted in a similar manner. With respect to the vehicle 1 in an oversteer situation, the oversteer can be counteracted by increasing the torque on the inner rear wheel (i.e., the right rear wheel 9 in the example of FIG. 1).

Alternatively, if the torque vectoring mechanism 11 instead were mounted at the front wheels 3, 5, oversteer may be counteracted by increasing the torque on the inner front wheel (right front wheel 5) and decreasing the torque on the outer front wheel (left front wheel 3). Similarly, understeer may be counteracted by increasing the torque on the outer front wheel (left front wheel 3) and decreasing the torque on the inner front wheel (right front wheel 5).

Figure 3:
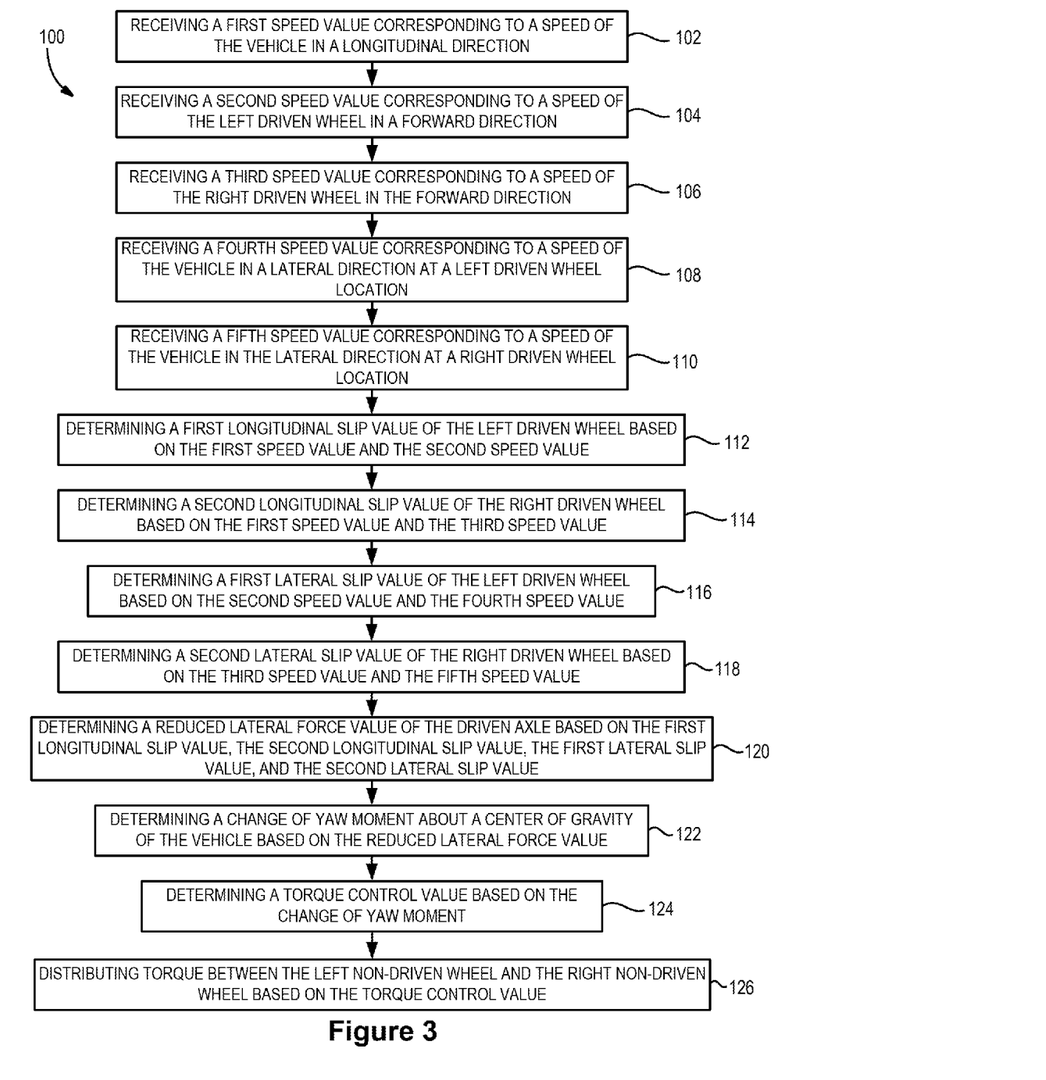
FIG. 3 is a flowchart describing an example method for controlling a torque vectoring mechanism according to some embodiments of the present disclosure.

Referring now to FIG. 3, a flowchart illustrating an example method 100 for controlling a torque vectoring mechanism 11 of a vehicle 1 according to some embodiments of the present disclosure is shown. The method 100 can, for example only, be performed by the controller 13 to control the torque vectoring mechanism 11 of the vehicle 1.

The method 100 describes the determination of a torque control value (by the controller 13) that can be provided to the torque vectoring mechanism 11 to distribute torque between the left and right non-driven wheels of the vehicle 1. The method 100 estimates a reduction in lateral force capacity on the driven axle 16 (which can include the left driven wheel 3 and/or the right driven wheel 5), based on various parameters. The controller 13 can utilize the reduction in the lateral force capacity on the driven axle 16 to determine a compensating torque or torques to be provided to the non-driven axle 18 and the left and right non-driven wheels 7, 9. The controller 13 can determine a torque control value based on the compensating torque(s), as further described below.

During performance of the method 100, the controller 13 can receive a plurality of speed values corresponding to the speed of the vehicle 1 and/or components of the vehicle 1. For example only, the controller can receive: a first speed value corresponding to a speed of the vehicle 1 in the longitudinal direction 35 (box 102), a second speed value corresponding to a speed of the left driven wheel of the vehicle 1 in a forward direction (box 104), a third speed value corresponding to a speed of the right driven wheel of the vehicle 1 in a forward direction (box 106), a fourth speed value corresponding to a speed of the vehicle 1 in a lateral direction 30 at a left driven wheel location (box 108), and a fifth speed value corresponding to a speed of the vehicle 1 in a lateral direction 30 at a right driven wheel location (box 110). These speed values can be determined and/or received by the controller 13, e.g., from one or more of the sensors 15. Some or all of these speed values can be employed to determine a torque control value that is provided to the torque vectoring mechanism 11 by the controller 13, as described below.

Based on the speed values received, the controller 13 can determine a longitudinal slip value for each of the left and right driven wheels. For example only, in box 112 the controller 13 can determine a first longitudinal slip value of the left driven wheel based on the first speed value (corresponding to the speed of the vehicle 1 in the longitudinal direction 35) and the second speed value (corresponding to the speed of the left driven wheel of the vehicle 1 in a forward direction). Similarly, in box 114 the controller 13 can determine a second longitudinal slip value of the right driven wheel based on the first speed value (corresponding to the speed of the vehicle 1 in the longitudinal direction 35) and the third speed value (corresponding to a speed of the right driven wheel of the vehicle 1 in a forward direction). In some embodiments, the first longitudinal slip value of the left driven wheel and the second longitudinal slip value of the right driven wheel can be determined based on the equations:

$$Sx1 = \frac{(Vx1) - (Vz)}{Vc1}, \text{ and}$$

$$Sx2 = \frac{(Vx2) - (Vz)}{Vc2},$$

wherein Sx1 is the first longitudinal slip value, Sx2 is the second longitudinal slip value, Vx1 is a sixth speed value corresponding to a speed of the vehicle in the longitudinal direction at a left driven wheel location, Vx2 is a seventh speed value corresponding to a speed of the vehicle in the longitudinal direction at a right driven wheel location, Vz is the speed of the vehicle in the longitudinal direction, Vc1 is an eighth speed value corresponding to a speed of the left driven wheel in the longitudinal direction, and Vc2 is a ninth speed value corresponding to a speed of the right driven wheel in the longitudinal direction. The sixth, seventh, eighth and ninth speed values can be determined and/or received by the controller 13, e.g., from one or more of the sensors 15.

Furthermore, based on the speed values received, the controller 13 can determine a lateral slip value for each of the left and right driven wheels. For example only, in box 116 the controller 13 can determine a first lateral slip value of the left driven wheel based on the second speed value (corresponding to the speed of the left driven wheel of the vehicle 1 in a forward direction) and the fourth speed value (corresponding to a speed of the vehicle 1 in a lateral direction 30 at a left driven wheel location). Similarly, in box 118 the controller 13 can determine a second lateral slip value of the right driven wheel based on the third speed value (corresponding to a speed of the right driven wheel of the vehicle 1 in a forward direction) and the fifth speed value (corresponding to a speed of the vehicle 1 in a lateral direction 30 at a right driven wheel location). In some embodiments, the first lateral slip value of the left driven wheel and the second lateral slip value of the right driven wheel can be determined based on the equations:

$$Sy1 = \frac{(Vy1)}{(Vc1)}, \text{ and}$$

$$Sy2 = \frac{(Vy2)}{(Vc2)}$$

wherein Sy1 is the first lateral slip value, Sy2 is the second lateral slip value, Vy1 is the fourth speed value corresponding to the speed of the vehicle in the lateral direction at the left driven wheel location, Vy2 is the fifth speed value corresponding to the speed of the vehicle in the lateral direction at the right driven wheel location, Vc1 is the eighth speed value corresponding to a speed of the left driven wheel in the longitudinal direction, and Vc2 is the ninth speed value corresponding to a speed of the right driven wheel in the longitudinal direction.

In box 120, the method 100 determines a reduction in lateral force of the driven axle 16 based on the two longitudinal and two lateral slip values determined in boxes 112, 114, 116 and 118. For example only, in some embodiments, the reduction in lateral force of the driven axle 16 can be determined based on the equation:

$$Fy\text{red} = (Fy\text{pure}) - (Fy\text{comb})$$

wherein Fyred is the reduced lateral force value of the driven axle, Fypure is the first lateral force value that corresponds to a measure of lateral force on the driven axle if the first and second longitudinal slip values are equal to 0, and Fycomb is the second lateral force value that corresponds to a measure of lateral force on the driven axle based on the first and second longitudinal slip values and the first and second lateral slip values. The first lateral force value can correspond to a measure of lateral force on the driven axle 16 if the first and second longitudinal slip values are equal to 0, and the second lateral force value can correspond to a measure of lateral force on the driven axle 16 based on the first and second longitudinal slip values and the first and second lateral slip values.

In some embodiments, the first lateral force value of the driven axle 16 can be determined based on the equation:

$$Fypure = -(C)(Sy) + \frac{(C)^2(Sy)|Sy|}{3(\mu)(Fz)} - \frac{(C)^3(Sy)^3}{27(\mu)^2(Fz)^2},$$

wherein Fypure is the first lateral force value, C is a constant based on lateral tire stiffness of the left and right driven wheels, Sy is the combined lateral slip value of the vehicle based on the first and second lateral slip values, Fz is the measure of vertical force on the left and right driven wheels, and μ is the friction coefficient based on the left and right driven wheels. The measure of vertical force on the left and right driven wheels (Fz) can, for example, be a known parameter of the vehicle. In some embodiments, the second lateral force value of the driven axle 16 can be determined based on the equation:

$$Fycomb = -(C)(Sy) + \frac{(Sy)\left(\sqrt{(Sy)^2 + (Sy)^2}\right)(C)^2}{3\mu} - \frac{(Sy)((Sy)^2 + (Sx)^2)(C)^3}{27(\mu)^2}$$

wherein Fycomb is the second lateral force value, C is a constant based on lateral tire stiffness of the left and right driven wheels, Sy is the combined lateral slip value of the vehicle based on the first and second lateral slip value, μ is the friction coefficient based on the left and right driven wheels and Sx is the combined lateral slip value of the vehicle based on the first and second lateral slip values.

In box 122, the method 100 determines a change in yaw moment about the center of gravity of the vehicle 1 based on the reduction in lateral force of the driven axle 16. For example only, in some embodiments, the change in yaw moment about the center of gravity of the vehicle 1 can be determined based on the equation:

$$\Delta Mz = (Fy\text{red})(Fz)(a),$$

wherein ΔMz is the change of yaw moment about the center of gravity of the vehicle, Fyred is the reduced lateral force value of the driven axle, Fz is the measure of vertical force on the left and right driven wheels and a is the distance between the center of gravity of the vehicle and the driven axle. The measure of vertical force on the left and right driven wheels Fz can, for example, be a known parameter of the vehicle.

A torque control value can be determined based on the change in yaw moment described above (in box 124). For example only, in some embodiments, the torque control value can be determined based on the equation:

$$Mv = \frac{(\Delta Mz)(Rs)}{(Tw)},$$

wherein Mv is the torque control value, ΔMz is the change of yaw moment about the center of gravity of the vehicle, Rs is the wheel radius of the left and right non-driven wheels, and Tw is the distance between the non-driven wheels. The controller 13 can provide the torque control value to the torque vectoring mechanism 11. The torque vectoring mechanism 11 can distribute torque between the left non-driven wheel and the right non-driven wheel based on the torque control value.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling a torque vectoring mechanism of a vehicle having a driven axle associated with a left driven wheel and a right driven wheel and a non-driven axle associated with a left non-driven wheel and a right non-driven wheel, the torque vectoring mechanism configured to distribute torque between the left non-driven wheel and the right non-driven wheel, the method comprising:

receiving a first speed value corresponding to a speed of the vehicle in a longitudinal direction;

receiving a second speed value corresponding to a speed of the left driven wheel in a forward direction;

receiving a third speed value corresponding to a speed of the right driven wheel in the forward direction;

receiving a fourth speed value corresponding to a speed of the vehicle in a lateral direction at a left driven wheel location;

receiving a fifth speed value corresponding to a speed of the vehicle in the lateral direction at a right driven wheel location;

determining a first longitudinal slip value of the left driven wheel based on the first speed value and the second speed value;

determining a second longitudinal slip value of the right driven wheel based on the first speed value and the third speed value;

determining a first lateral slip value of the left driven wheel based on the second speed value and the fourth speed value;

determining a second lateral slip value of the right driven wheel based on the third speed value and the fifth speed value;

determining a reduced lateral force value of the driven axle based on the first longitudinal slip value, the second longitudinal slip value, the first lateral slip value, and the second lateral slip value;

determining a change of yaw moment about a center of gravity of the vehicle based on the reduced lateral force value;

determining a torque control value based on the change of yaw moment; and distributing torque between the left non-driven wheel and the right non-driven wheel based on the torque control value.

2. The method of claim 1, wherein determining the first longitudinal slip value of the left driven wheel is based on:

$$Sx1 = \frac{(Vx1) - (Vz)}{Vc1},$$

and determining the second longitudinal slip value of the right driven wheel is based on:

$$Sx2 = \frac{(Vx2) - (Vz)}{Vc2},$$

wherein Sx1 is the first longitudinal slip value, Sx2 is the second longitudinal slip value, Vx1 is a sixth speed value corresponding to a speed of the vehicle in the longitudinal direction at a left driven wheel location, Vx2 is a seventh speed value corresponding to a speed of the vehicle in the longitudinal direction at a right driven wheel location, Vz is the speed of the vehicle in the longitudinal direction, Vc1 is an eighth speed value corresponding to a speed of the left driven wheel in the longitudinal direction, and Vc2 is a ninth speed value corresponding to a speed of the right driven wheel in the longitudinal direction.

3. The method of claim 1, wherein determining the first lateral slip value of the left driven wheel is based on:

$$Sy1 = \frac{(Vy1)}{(Vc1)},$$

and
determining the second lateral slip value of the right driven wheel is based on:

$$Sy2 = \frac{(Vy2)}{(Vc2)},$$

wherein Sy1 is the first lateral slip value, Sy2 is the second lateral slip value, Vy1 is the fourth speed value corresponding to the speed of the vehicle in the lateral direction at the left driven wheel location, Vy2 is the fifth speed value corresponding to the speed of the vehicle in the lateral direction at the right driven wheel location, Vc1 is an eighth speed value corresponding to a speed of the left driven wheel in the longitudinal direction, and Vc2 is a ninth speed value corresponding to a speed of the right driven wheel in the longitudinal direction.

4. The method of claim 1, wherein determining the reduced lateral force value of the driven axle is based on:

$$Fyred = (Fypure) - (Fycomb),$$

wherein Fyred is the reduced lateral force value of the driven axle, Fypure is a first lateral force value that corresponds to a measure of lateral force on the driven axle if the first and second longitudinal slip values are equal to 0, and Fycomb is a second lateral force value that corresponds to a measure of lateral force on the driven axle based on the first and second longitudinal slip values and the first and second lateral slip values.

5. The method of claim 4, wherein the first lateral force value of the driven axle is based on:

$$Fypure = -(C)(Sy) + \frac{(C)^2(Sy)|Sy|}{3(\mu)(Fz)} - \frac{(C)^3(Sy)^3}{27(\mu)^2(Fz)^2},$$

wherein Fypure is the first lateral force value, C is a constant based on lateral tire stiffness of the left and right driven wheels, Sy is a combined lateral slip value of the vehicle based on the first and second lateral slip values, Fz is a measure of vertical force on the left and right driven wheels, and μ is a friction coefficient based on the left and right driven wheels.

6. The method of claim 5, wherein the second lateral force value of the driven axle is based on:

$$Fycomb = -(C)(Sy) + \frac{(Sy)\left(\sqrt{(Sx)^2 + (Sy)^2}\right)(C)^2}{3\mu} - \frac{(Sy)((Sy)^2 + (Sx)^2)(C)^3}{27(\mu)^2},$$

wherein Fycomb is the second lateral force value, C is the constant based on lateral tire stiffness of the left and right driven wheels, Sy is the combined lateral slip value of the vehicle based on the first and second lateral slip value, μ is the friction coefficient based on the left and right driven wheels and Sx is a combined lateral slip value of the vehicle based on the first and second lateral slip values.

7. The method of claim 6, wherein determining the change of yaw moment about the center of gravity of the vehicle is based on:

$$\Delta Mz = (Fyred)(Fz)(a),$$

wherein ΔMz is the change of yaw moment about the center of gravity of the vehicle, Fyred is the reduced lateral force value of the driven axle, Fz is a measure of vertical force on the left and right driven wheels and a is a distance between the center of gravity of the vehicle and the driven axle.

8. The method of claim 7, wherein determining the torque control value is based on:

$$Mv = \frac{(\Delta Mz)(Rs)}{(Tw)},$$

wherein Mv is the torque control value, ΔMz is the change of yaw moment about the center of gravity of the vehicle, Rs is a wheel radius of the left and right non-driven wheels, and Tw is a distance between the non-driven wheels.

9. A torque vectoring system, comprising:
a torque vectoring mechanism associated with a vehicle having a driven axle associated with a left driven wheel and a right driven wheel and a non-driven axle associated with a left non-driven wheel and a right non-driven wheel, the torque vectoring mechanism distributing torque between the left non-driven wheel and the right non-driven wheel based on a torque control value; and
a controller that provides the torque control value to the torque vectoring mechanism, the controller determining the torque control value by:
receiving a first speed value corresponding to a speed of the vehicle in a longitudinal direction;
receiving a second speed value corresponding to a speed of the left driven wheel in a forward direction;
receiving a third speed value corresponding to a speed of the right driven wheel in the forward direction;
receiving a fourth speed value corresponding to a speed of the vehicle in a lateral direction at a left driven wheel location;
receiving a fifth speed value corresponding to a speed of the vehicle in the lateral direction at a right driven wheel location;
determining a first longitudinal slip value of the left driven wheel based on the first speed value and the second speed value;
determining a second longitudinal slip value of the right driven wheel based on the first speed value and the third speed value;

determining a first lateral slip value of the left driven wheel based on the second speed value and the fourth speed value;

determining a second lateral slip value of the right driven wheel based on the third speed value and the fifth speed value;

determining a reduced lateral force value of the driven axle based on the first longitudinal slip value, the second longitudinal slip value, the first lateral slip value, and the second lateral slip value;

determining a change of yaw moment about a center of gravity of the vehicle based on the reduced lateral force value; and determining a torque control value based on the change of yaw moment.

10. The torque vectoring system of claim 9, wherein determining the first longitudinal slip value of the left driven wheel is based on:

$$Sx1 = \frac{(Vx1) - (Vz)}{Vc1},$$

and determining the second longitudinal slip value of the right driven wheel is based on:

$$Sx2 = \frac{(Vx2) - (Vz)}{Vc2},$$

wherein Sx1 is the first longitudinal slip value, Sx2 is the second longitudinal slip value, Vx1 is a sixth speed value corresponding to a speed of the vehicle in the longitudinal direction at a left driven wheel location, Vx2 is a seventh speed value corresponding to a speed of the vehicle in the longitudinal direction at a right driven wheel location, Vz is the speed of the vehicle in the longitudinal direction, Vc1 is an eighth speed value corresponding to a speed of the left driven wheel in the longitudinal direction, and Vc2 is a ninth speed value corresponding to a speed of the right driven wheel in the longitudinal direction.

11. The torque vectoring system of claim 9, wherein determining the first lateral slip value of the left driven wheel is based on:

$$Sy1 = \frac{(Vy1)}{(Vc1)},$$

and determining the second lateral slip value of the right driven wheel is based on:

$$Sy2 = \frac{(Vy2)}{(Vc2)},$$

wherein Sy1 is the first lateral slip value, Sy2 is the second lateral slip value, Vy1 is the fourth speed value corresponding to the speed of the vehicle in the lateral direction at the left driven wheel location, Vy2 is the fifth speed value corresponding to the speed of the vehicle in the lateral direction at the right driven wheel location, Vc1 is an eighth speed value corresponding to a speed of the left driven wheel in the longitudinal direction, and Vc2 is a ninth speed value corresponding to a speed of the right driven wheel in the longitudinal direction.

12. The torque vectoring system of claim 9, wherein determining the reduced lateral force value of the driven axle is based on:

$$Fyred = (Fypure) - (Fycomb),$$

wherein Fyred is the reduced lateral force value of the driven axle, Fypure is a first lateral force value that corresponds to a measure of lateral force on the driven axle if the first and second longitudinal slip values are equal to 0, and Fycomb is a second lateral force value that corresponds to a measure of lateral force on the driven axle based on the first and second longitudinal slip values and the first and second lateral slip values.

13. The torque vectoring system of claim 12, wherein the first lateral force value of the driven axle is based on:

$$Fypure = -(C)(Sy) + \frac{(C)^2(Sy)|Sy|}{3(\mu)(Fz)} - \frac{(C)^3(Sy)^3}{27(\mu)^2(Fz)^2},$$

wherein Fypure is the first lateral force value, C is a constant based on lateral tire stiffness of the left and right driven wheels, Sy is a combined lateral slip value of the vehicle based on the first and second lateral slip values, Fz is a measure of vertical force on the left and right driven wheels, and μ is a friction coefficient based on the left and right driven wheels.

14. The torque vectoring system of claim 13, wherein the second lateral force value of the driven axle is based on:

$$Fycomb = -(C)(Sy) + \frac{(Sy)\left(\sqrt{(Sx)^2 + (Sy)^2}\right)(C)^2}{3\mu} - \frac{(Sy)((Sy)^2 + (Sx)^2)(C)^3}{27(\mu)^2},$$

wherein Fycomb is the second lateral force value, C is the constant based on lateral tire stiffness of the left and right driven wheels, Sy is the combined lateral slip value of the vehicle based on the first and second lateral slip value, μ is the friction coefficient based on the left and right driven wheels and Sx is a combined lateral slip value of the vehicle based on the first and second lateral slip values.

15. The torque vectoring system of claim 14, wherein determining the change of yaw moment about the center of gravity of the vehicle is based on:

$$\Delta Mz = (Fyred)(Fz)(a),$$

wherein ΔMz is the change of yaw moment about the center of gravity of the vehicle, Fyred is the reduced lateral force value of the driven axle, Fz is a measure of vertical force on the left and right driven wheels and a is a distance between the center of gravity of the vehicle and the driven axle.

16. The torque vectoring system of claim 15, wherein determining the torque control value is based on:

$$Mv = \frac{(\Delta Mz)(Rs)}{(Tw)},$$

wherein Mv is the torque control value, ΔMz is the change of yaw moment about the center of gravity of the vehicle, Rs is a wheel radius of the left and right non-driven wheels, and Tw is a distance between the non-driven wheels.

17. A non-transitory tangible computer readable medium encoded with instructions which, when executed, cause a processor to perform operations to control a torque vectoring mechanism of a vehicle having a driven axle associated with a left driven wheel and a right driven wheel and a non-driven axle associated with a left non-driven wheel and a right non-driven wheel, the torque vectoring mechanism configured to distribute torque between the left non-driven wheel and the right non-driven wheel, the operations comprising:
   receiving a first speed value corresponding to a speed of the vehicle in a longitudinal direction;
   receiving a second speed value corresponding to a speed of the left driven wheel in a forward direction;
   receiving a third speed value corresponding to a speed of the right driven wheel in the forward direction;
   receiving a fourth speed value corresponding to a speed of the vehicle in a lateral direction at a left driven wheel location;
   receiving a fifth speed value corresponding to a speed of the vehicle in the lateral direction at a right driven wheel location;
   determining a first longitudinal slip value of the left driven wheel based on the first speed value and the second speed value;
   determining a second longitudinal slip value of the right driven wheel based on the first speed value and the third speed value;
   determining a first lateral slip value of the left driven wheel based on the second speed value and the fourth speed value;
   determining a second lateral slip value of the right driven wheel based on the third speed value and the fifth speed value;
   determining a reduced lateral force value of the driven axle based on the first longitudinal slip value, the second longitudinal slip value, the first lateral slip value, and the second lateral slip value;
   determining a change of yaw moment about a center of gravity of the vehicle based on the reduced lateral force value;
   determining a torque control value based on the change of yaw moment; and
   distributing torque between the left non-driven wheel and the right non-driven wheel based on the torque control value.

18. The non-transitory tangible computer readable medium of claim 17, wherein the first lateral force value of the driven axle is based on:

$$Fypure = -(C)(Sy) + \frac{(C)^2(Sy)|Sy|}{3(\mu)(Fz)} - \frac{(C)^3(Sy)^3}{27(\mu)^2(Fz)^2},$$

and
the second lateral force value of the driven axle is based on:

$$Fycomb = -(C)(Sy) + \frac{(Sy)\left(\sqrt{(Sx)^2 + (Sy)^2}\right)(C)^2}{3\mu} - \frac{(Sy)((Sy)^2 + (Sx)^2)(C)^3}{27(\mu)^2},$$

wherein Fypure is the first lateral force value, Fycomb is the second lateral force value, C is a constant based on lateral tire stiffness of the left and right driven wheels, Sy is a combined lateral slip value of the vehicle based on the first and second lateral slip values, Sx is a combined lateral slip value of the vehicle based on the first and second lateral slip value, Fz is a measure of vertical force on the left and right driven wheels, and μ is a friction coefficient based on the left and right driven wheels.

19. The non-transitory tangible computer readable medium of claim 18, wherein determining the change of yaw moment about the center of gravity of the vehicle is based on:

$\Delta Mz = (Fyred)(Fz)(a)$, wherein ΔMz is the change of yaw moment about the center of gravity of the vehicle, Fyred is the reduced lateral force value of the driven axle, Fz is a measure of vertical force on the left and right driven wheels and a is a distance between the center of gravity of the vehicle and the driven axle.

20. The non-transitory tangible computer readable medium of claim 19, wherein determining the torque control value is based on:

$$Mv = \frac{(\Delta Mz)(Rs)}{(Tw)},$$

wherein Mv is the torque control value, ΔMz is the change of yaw moment about the center of gravity of the vehicle, Rs is a wheel radius of the left and right non-driven wheels, and Tw is a distance between the non-driven wheels.

* * * * *